Patented Nov. 13, 1934

1,980,555

UNITED STATES PATENT OFFICE 1,980,555

PROCESS FOR TREATING OILS WITH AN ALKALINE SULPHIDE

Walter A. Schulze and Frederick E. Frey, Bartlesville, Okla., assignors to Phillips Petroleum Company, Bartlesville, Okla., a corporation of Delaware No Drawing. Application January 7, 1932, Serial No. 585,389

10 Claims. (Cl. 196—44)

The present invention relates to a novel and improved process for treating and stabilizing hydrocarbon oils. More specifically, this invention has particular relation to a new process for imparting stability to hydrocarbon oils after the latter have been subjected to a purifying treatment involving the use of copper-containing reagents.

Hydrocarbon oils, and in particular, kerosene, gasoline and similar petroleum distillates usually contain considerable amounts of sulphur, generally in the form of mercaptans and other malodorous and corrosive impurities. In treating such hydrocarbon oils to purify and improve them, use is frequently made of copper chloride and other copper salts, as well as salts of the other heavy metals such as mercury, for the purpose of removing such offensive impurities or converting them into harmless forms.

Mercury compounds resulting from the purification treatment are absorbed and retained by the treating oil and have been removed therefrom by making use of hydrogen sulphide or the like as a precipitating agent. However, copper salts of inorganic acids are insoluble in hydrocarbon oils, and where a copper reagent has heretofore been employed in the oil purification, the removal of the copper salts has not been an issue. Ordinary analytical methods show copper treated oils, such as applicants propose to stabilize, to be substantially copper free. Henderson (U. S. Patent No. 1,815,563) points out that there was no loss of copper from his solution and accordingly makes no provision for removing copper from the treated oil; and this is representative of the accepted practice.

Oils treated with these copper reagents, however, in spite of their apparently copper-free condition, are found to exhibit a progressive tendency to discolor following the use of these reagents, or to have an increased tendency to form involatile resinous matter, polymers, and malodorous constituents.

Accordingly, a primary object of the present invention is the treatment of oils of the character aforementioned to stabilize them against such deterioration after the use of copper compounds in the purification treatment thereof as above described.

Another object of the invention is to reduce, delay or prevent the discoloring of such treated oils.

A still further object of this invention is to reduce, delay or prevent the formation of resinous matter, polymers, and malodorous products.

The foregoing and other objects, which will be apparent to those skilled in the art to which the present invention pertains from the disclosure thereof hereinafter set forth, are attained by the invention described in detail below.

Applicants have discovered that the increased tendency to undergo the deterioratory changes above stated is due to the initiation or acceleration of oxidation and condensation reactions by minute concentrations of compounds of copper, such as mercaptides, naphthenates or the like, which, contrary to accepted belief, are present in the copper reagent treated oil, and which act as catalysts.

Copper compounds are notorious oxidation catalysts. Traces of copper too small to detect by ordinary methods have been actually estimated by conducting oxidation of sulphites by oxygen in the presence of the suspected copper. This has given rise to the problem of stabilizing such oils against deterioration through catalytic oxidation, which is peculiar to copper reagent treating, and which applicants have solved by the present invention.

Applicants have further found that an oil treated with copper and which exhibits discoloring and/or formation of resinous matter, polymers and oxidation products can be stabilized, that is, treated to delay, reduce or prevent such changes, by bringing the oil into intimate contact with an alkaline sulphide subsequent to treatment with the metallic compound.

Any inorganic sulphide capable of yielding sulphide or hydrosulphide ions in solution, such as sodium or calcium sulphide, may effectively be used. Alkalies which have been used to purify oils and gases containing hydrogen sulphide will contain soluble sulphides and may be used for the purpose, preferably after removal of mercaptans by distillation or equivalent means.

The sulphide may most conveniently be brought into contact with the oil by commingling an aqueous solution of a soluble sulphide, such as sodium sulphide, and the oil, and thereafter separating the stabilized oil from the aqueous sulphide solution.

The concentration of the sodium sulphide may vary within wide limits without seriously impairing its effectiveness. A concentration as low as 0.5 percent is effective. A concentration in the neighborhood of 5 to 10 percent usually gives best results. A high alkalinity is to be preferred because it insures the absence of hydrogen sulphide in the treated oil. For this reason the addition of sodium hydroxide, preferably to the extent of 5 to 10 percent, to the sulphide solution is desirable.

The contacting of the sulphide solution with the oil to be treated may be effected either by a continuous or batch method in the usual ways. For example, the oil may be atomized continually in a body of sulphide solution and withdrawn in the stabilized condition from the top of the solution, or in the batch method, a body of oil may be agitated with a portion of sulphide solution and afterward separated therefrom. Ordinary temperatures, in the neighborhood of 20° C., may be used, and the time of contact may be short and need not greatly exceed that required for obtaining intimate physical contact. Since the quantity of impurity removed is very small, a quantity of sulphide may be used to treat many times its weight of oil, either at one time or in consecutive portions.

Applicants are aware of the use of alkaline sulphides for removing elementary sulphur from oils. Elevated temperatures and/or long reaction times are required. The stabilizing of copper treated oils by sodium sulphide is completed in a very short time, even at ordinary temperatures, provided intimacy of contact between sulphide and oil is obtained. Consequently the treating of an oil for stabilization is usually best conducted under conditions insufficiently severe to bring about an advantageous reduction in elementary sulphur.

As an example of the application of the process according to the present invention, a cracked gasoline reacting sour to the sodium plumbite test, produced by the cracking of petroleum high in sulphur, was agitated with a solution containing 14 percent of sodium chloride and 15 percent of cupric sulphate pentahydrate in water for a period of 5 minutes, whereupon the gasoline was separated from the aqueous solution, agitated with aqueous sodium hydroxide and with water, after which it was found to be sweet to the doctor test, that is, to exhibit no discoloring upon agitation with aqueous sodium plumbite and sulphur. A portion of this gasoline, kept in the dark in the presence of air for sixty days, became yellow in color and a portion of 50 cubic centimeters evaporated to dryness on a steam bath left a nonvolatile residue weighing 11.5 milligrams. Another portion of the same gasoline, immediately after sweetening, was agitated for two minutes at room temperature with one-fifth of its volume of a solution of 10 percent sodium sulphide and 5 percent of sodium hydroxide in water, separated from the aqueous liquid, agitated briefly with water, and separated therefrom, kept in the dark for sixty days under the same conditions. Virtually no discoloring took place during this period and a non-volatile residue weighing only 0.7 milligrams was obtained from a 50 cc. portion.

It is evident from the foregoing that applicants have discovered and disclosed a new method of stabilizing copper reagent treated oils which constitutes an important technical step forward in the art.

Having thus described the present invention, what is claimed is:

1. The method of stabilizing oil, which has been treated with a copper reagent, against catalytic deterioration which comprises bringing said oil in liquid phase into intimate contact with a sulphide from the group consisting of the alkali and alkaline earth metals at substantially atmospheric temperature.

2. In the refining of oil treated with a compound of copper, the step of subsequently bringing the oil in liquid phase into intimate contact with an aqueous solution of a sulphide from the group consisting of the alkali and alkaline earth metals at substantially atmospheric temperature, whereby stabilization of the oil is effected.

3. In the refining of oils containing mercaptans, the steps of treating the oil with an aqueous solution containing cupric halides to sweeten the same, and subsequently stabilizing the sweetened oil against catalytic oxidation by bringing it in liquid phase into intimate contact with an aqueous solution of a sulphide from the group consisting of the alkali and alkaline earth metals at substantially atmospheric temperature.

4. The method of stabilizing oil which has been treated with a copper reagent, which comprises treating said oil in liquid phase with sodium sulphide.

5. The method of stabilizing hydrocarbon oils, which have been subjected to a purifying treatment involving the use of copper-containing reagents, which comprises commingling the oil in liquid phase with an aqueous solution of a soluble sulphide at substantially atmospheric temperature, and then separating the stabilized oil from said solution.

6. The method of stabilizing oils, which have been sweetened by means of copper-containing reagents, against deterioration through catalytic oxidation, which comprises intimately contacting the oil in liquid phase, subsequent to treatment thereof with the metallic reagent, with a solution of a compound capable of yielding sulphide or hydrosulphide ions, at substantially atmospheric temperature.

7. The method of stabilizing oil which has been treated with a copper reagent, which comprises treating said oil in liquid phase with an aqueous sodium sulphide of a concentration ranging from 0.5 to 10% or more, in presence of an alkali, at substantially atmospheric temperature.

8. The method of stabilizing oil, which has been treated with a copper reagent, against deterioration, which comprises bringing said oil in liquid phase into intimate contact with a sulphide of the group consisting of the alkali and alkaline earth metals, in the presence of an alkali, at substantially atmospheric temperature.

9. The method of stabilizing hydrocarbon oils, which have been subjected to a purifying treatment involving the use of copper-containing reagents, which comprises commingling the oil in liquid phase with an aqueous solution of a soluble sulphide, in the presence of an alkali, at substantially atmospheric temperature, and then separating the stabilized oil from said solution.

10. The method of stabilizing oils, which have been sweetened by copper-containing reagents, against deterioration through catalytic oxidation, which comprises intimately contacting the oil in liquid phase, subsequent to treatment thereof with the metallic reagent, with a solution of a compound capable of yielding sulphide or hydrosulphide ions, in the presence of an alkali at substantially atmospheric temperature.

WALTER A. SCHULZE.
FREDERICK E. FREY.